US012725799B2

(12) United States Patent
Andrews et al.

(10) Patent No.: US 12,725,799 B2
(45) Date of Patent: Sep. 1, 2026

(54) REVERSIBLE F-ION INTERCALATION HOST FOR USE IN ROOM TEMPERATURE F-ION BATTERIES

(71) Applicant: UNIVERSITY OF SOUTHERN CALIFORNIA, Los Angeles, CA (US)

(72) Inventors: Jessica Andrews, Los Angeles, CA (US); Eric McClure, Los Angeles, CA (US); Brent Melot, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 703 days.

(21) Appl. No.: 18/100,096

(22) Filed: Jan. 23, 2023

(65) Prior Publication Data

US 2023/0307637 A1 Sep. 28, 2023

Related U.S. Application Data

(60) Provisional application No. 63/322,962, filed on Mar. 23, 2022.

(51) Int. Cl.

| | |
|---|---|
| ***H01M 4/58*** | (2010.01) |
| ***C01G 49/00*** | (2006.01) |
| ***H01M 10/054*** | (2010.01) |

(52) U.S. Cl.

CPC .......... *H01M 4/582* (2013.01); *C01G 49/009* (2013.01); *H01M 10/054* (2013.01); *C01P 2006/40* (2013.01)

(58) Field of Classification Search

None

See application file for complete search history.

(56) References Cited

PUBLICATIONS

Raju, K.S.—Characterization of modified pyrochlores CsMFeF6 (M=Mn, Co and Zn), Journal of Crystal Growth, 128 (1993) pp. 1078-1080 (Year: 1993).*

Euchner, H., Clemens, O., Anji Reddy, M.—Unlocking the potential of weberite-type metal fluorides in electrochemical energy storage, NPJ Computational Materials, 5, 2019 (Year: 2019).*

Raju, K.S., Wanklyn, B.M.—X-ray photoelectron spectroscopic studies of flux grown CsMnFeF6 single crystals, Journal of Materials Science Letters 13(1994) pp. 1706-1708 (Year: 1994).*

* cited by examiner

*Primary Examiner* — Anca Eoff

(74) *Attorney, Agent, or Firm* — Snell & Wilmer LLP

(57) ABSTRACT

A fluoride composition configured for fluoride ion intercalation, the fluoride composition comprising one of: a) a defect fluoride pyrochlore composition of the general formula $AM^{II}M^{III}F_6$; or b) a fluoride weberite composition of the general formula $A_{1-2}MM'\ F_{6-7}$, where the oxidation state of M and M' are such that the composition is charge balanced. An F-ion energy storage cell comprising: a first electrode configured for fluoride ion intercalation, where the first electrode comprises one of: a defect fluoride pyrochlore composition, or a fluoride weberite composition; a second electrode; an electrolyte; and a separator. A method of manufacturing an F-ion energy storage cell comprising forming an F-ion composition configured for fluoride ion intercalation; forming a first electrode from the F-ion composition; and forming a cell having the first electrode, a second electrode, a separator, and an electrolyte.

5 Claims, 3 Drawing Sheets cycle 1
cycle 2
cycle 3
pre-cycling
post-ox1
post-red1
-Z'' (Ohm)
Z' (Ohm)
V vs. Bi/Bi3+
Capacity (mAh g-1)

cycle 6
cycle 7
dQ/dV (mAhg-1V-1)
V vs. Bi/Bi3+
Capacity (mAh g-1)

REVERSIBLE F-ION INTERCALATION HOST FOR USE IN ROOM TEMPERATURE F-ION BATTERIES

CROSS-REFERENCE TO RELATED APPLICATIONS

This application claims priority to, and the benefit of, U.S. Prov. Pat. Appl. Ser. No. 63/322,962, entitled "A Reversible F-Ion Intercalation Host For Use In Room Temperature F-Ion Batteries," filed on Mar. 23, 2022, the entirety of which is incorporated herein for all purposes by this reference.

STATEMENT AS TO FEDERALLY SPONSORED RESEARCH

This invention was made with government support under contract number DE-SC0019381 awarded by the Department of Energy, and 1842487 awarded by the National Science Foundation. The government has certain rights in this invention.

FIELD

Compositions, devices and methods are disclosed for an F-ion rechargeable energy storage device (secondary cells), and more specifically for reversible, electrochemical (de) fluorination of defect fluoride pyrochlores, of the general formula $AM^{II}M^{III}F_6$ (where A=$K^+$, $Rb^+$, $Cs^+$; $M^{II}$=$Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$; $M^{III}$=$Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$) and weberite-type phases, of the general formula $A_{1-2}MM'F_{6-7}$ (where A=$Na^+$, $K^+$, $Rb^+$, $Cs^+$; M/M'=$Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$, $Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$; wherein the oxidation state of M and M' are such that the composition is charge balanced), at room-temperature using a liquid electrolyte.

BACKGROUND

Research and development in the field of energy storage is currently at an all-time high with efforts to improve many aspects of current technology. In particular, great efforts are being made to improve Li-ion batteries in terms of energy density (more charge in less space and with less weight), safety, and performance. Though a dominant technology, not all research is focused on Li-ion battery chemistries, and other chemistries are constantly being developed and tested with various degrees of success. There remains ample desire for energy storage solutions of different chemistries, to improve upon various shortcomings of the current state-of-art.

SUMMARY

In an example embodiment, a fluoride composition configured for fluoride ion intercalation is disclosed, the fluoride composition comprising one of: a) a defect fluoride pyrochlore composition of the general formula $AM^{II}M^{III}F_6$ (where A=$K^+$, $Rb^+$, $Cs^+$; $M^{II}$=$Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$; $M^{III}$=$Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$); or b) a fluoride weberite-type composition of the general formula $A_{1-2}MM'F_{6-7}$ (where A=$Na^+$, $K^+$, $Rb^+$, $Cs^+$; M/M'=$Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$, $Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$), wherein the oxidation state of M and M' are such that the composition is charge balanced.

In another example embodiment, an F-ion energy storage cell is disclosed comprising: a first electrode configured for fluoride ion intercalation, wherein the first electrode comprises one of: a defect fluoride pyrochlore composition, or a fluoride weberite-type composition; a second electrode; an electrolyte; and a separator.

In yet another example embodiment, a method of manufacturing an F-ion energy storage cell is disclosed. The method may comprise: forming an F-ion composition configured for fluoride ion intercalation, the F-ion composition comprising one of: a) a defect pyrochlore formed from one of mechanochemical methods, ceramic methods, and hydrothermal methods; or b) a fluoride weberite-type composition; forming a first electrode from the F-ion composition; and forming a cell having the first electrode, a second electrode, a separator, and an electrolyte.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
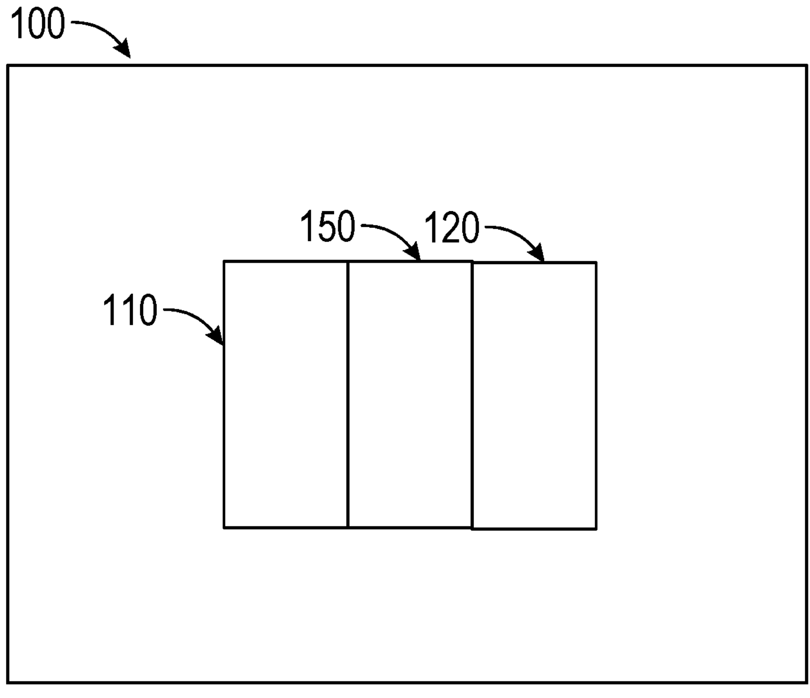
FIG. 1 is a block diagram illustrating an example F-ion energy storage cell, in accordance with an example embodiment.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In accordance with an example embodiment, compositions, devices and methods are disclosed for a reversible F-ion intercalation host. The composition may comprise a defect fluoride pyrochlore composition of the general formula $AM^{II}M^{III}F_6$. In an example embodiment, A=$K^+$, $Rb^+$, $Cs^+$; $M^{II}$=$Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$; $M^{III}$=$Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$. Moreover, it should be understood that the general formula is intended to include mixed metal sites, for example, $M^{II}$ could comprise one or a combination of the listed divalent cations, and the like. In one example embodiment, the defect fluoride pyrochlore is a mixed B-site defect fluoride pyrochlore composition. However other suitable replacements may be used consistent with this disclosure. In accordance with various example embodiments, the composition is configured for anionic intercalation (in contrast to or in addition to cationic intercalation). It is noted that anions typically have a significantly larger radii than cations and have a negative charge, therefore the diffusion of anions through densely packed solids may require significantly different conditions than that associated with mobile cations. Thus, anionic intercalation may differ greatly from cation energy storage and may provide a greatly improved solution for rechargeable energy storage devices.

In one example embodiment, the F-ion composition is synthesized. In an example embodiment, the F-ion composition may be synthesized using ceramic methods, hydrothermal methods, or mechanochemical methods. For example, $CsMnFeF_6$ may be synthesized via one of three different synthetic methods (hydrothermal, ceramic, and mechanochemical). Each of these synthetic methods produces products of varying particle size and phase purity. Moreover, any suitable method of synthesizing the F-ion composition or $CsMnFeF_6$ may be used.

Various examples of how the F-ion composition may be synthesized are set forth herein, though these are only examples, and any suitable method for synthesizing the F-ion composition may be used. In the examples set forth below, the solid reagents were dried under vacuum at 110 degrees C. for 24 hours.

In one example embodiment, using the hydrothermal method, $CsMnFeF_6$ was synthesized by combining the binary metal fluorides (CsF, $MnF_2$, and $FeF_3$) and concentrated hydrofluoric acid in a FEP Teflon pouch. The pouch was sealed and placed in a pressure vessel with deionized water back-fill, heated to and held at 150 degrees C. for 24 hours, then cooled slowly to room temperature to precipitate polycrystalline $CsMnFeF_6$.

In another example embodiment, using the ceramic method, the starting metal fluorides (CsF, $MnF_2$, and $FeF_3$) were ground together, then pressed into a pellet(s) and sealed in an Inconel tube under Ar atmosphere. The sealed tube was heated to 500 degrees C. for 12 hours, then cooled naturally to yield $CsMnFeF_6$.

In another example embodiment, using the mechanochemical method, $CsMnFeF_6$ was synthesized rapidly via high-energy ball milling of the starting metal fluorides (CsF, $MnF_2$, and $FeF_3$).

Thus, in an example embodiment, the composition comprises one of: mechanochemical materials, ceramic materials, and hydrothermal materials. In an example embodiment, the composition comprises mechanochemical materials having particles, which when pristine, range in size from approximately 500 nm to 20 um. In an example embodiment, the particles may be smaller than 10 um on average.

The particles from the ceramic materials may comprise relatively smaller particles, being approximately 5 um in diameter at the largest, 500 nm in diameter at the smallest, and on average closer to 1 um.

Although each of these materials performed reversible electrochemical (de)fluorination, in various analyses performed, the mechanochemical product significantly outperformed the hydrothermal and ceramic products. Moreover, in various example embodiments, the F-ion composition is configured to have a particle size, phase purity, and mixed valency configured for improved (and/or optimized) reversibility and efficiency of electrochemical (de)fluorination.

In one example embodiment, all three of these materials contain a majority of octahedral Fe(III). In an example embodiment, the redox couples invoked during the (de) fluorination of $CsMnFeF_6$ are $Fe^{3+/2+}$ and $Mn^{3+/2+}$.

Thus, in an example embodiment, the composition is a defect fluoride pyrochlore that undergoes reversible, electrochemical (de)fluorination. In one example embodiment, the defect fluoride pyrochlore is $CsMnFeF_6$. In an example embodiment, the composition is in either a cubic or orthorhombic unit cell, electrochemically cycled at room-temperature using a liquid electrolyte. In an example embodiment, the composition is further configured for anionic intercalation with a fluoride anion. In another example embodiment, the composition is configured to have sufficient F-ion mobility to reversibly (de)intercalate fluoride ions at room temperature.

In accordance with various example embodiments, a method of making the F-ion composition comprises synthesizing a defect fluoride pyrochlore. As stated above, in one example embodiment, the defect fluoride pyrochlore is $CsMnFeF_6$. The $CsMnFeF_6$ may be synthesized via hydrothermal, ceramic and/or mechanical processes, as described above.

In an example embodiment, an F-ion electrode is disclosed. In this example embodiment, the F-ion electrode may comprise a defect pyrochlore, where the F-ion electrode comprises an F-ion intercalation host. In one example embodiment, the defect pyrochlore is a mixed B-site defect fluoride pyrochlore. In an example embodiment, the F-ion electrode further comprises anionic vacancies and room-temperature fluoride ion conductivity. In an example embodiment, an electrode comprises the F-ion composition. For example, the F-ion composition may be coated on the current collector. In an example embodiment, the second electrode comprises a $M/MF_x$ composite electrode (where M is a metal and $MF_x$ is the corresponding metal fluoride) or a second defect fluoride pyrochlore composition. In one example embodiment, the electrodes are $Bi/BiF_3$ composite electrodes.

In one example embodiment, to produce the $Bi/BiF_3$ composite counter electrodes, Bi metal powder and anhydrous $Bi/BiF_3$ were mixed with a conductive carbon and poly(vinylidene fluoride) in a minimal amount of solvent to form a slurry, the slurry was then coated on an aluminum foil and dried. In another example embodiment the counter electrodes may be produced by dry mixing Bi metal powder, anhydrous $Bi/BiF_3$, conductive carbon and poly(tetrafluoroethylene). The mix is then pressed into pellets and the pellets dried. Moreover, any suitable methods of producing the $Bi/BiF_3$ composite counter electrodes consistent with this disclosure may be used.

In an example embodiment, and with reference to FIG. 1, an example F-ion energy storage cell (F-ion battery cell) 100 is disclosed. In an example embodiment, the F-ion battery cell 100 may comprise a first electrode 110 (comprising the F-ion composition), a second electrode 120, a separator 150, and an electrolyte (not shown). Stated another way, in an example embodiment, the F-ion energy storage cell may comprise: a first electrode 110, wherein the first electrode comprises a defect fluoride pyrochlore composition; a second electrode 120; an electrolyte; and a separator 150.

In one example embodiment, the separator 150 is a glass fiber separator. The glass fiber separator may be soaked in an electrolyte solution of 1.0 M tetra-n-butylammonium fluoride (TBAF) dissolved in tetrahydrofuran (THF), providing a source of free fluoride ions and separating the first electrode and the second electrode (i.e., the working and counter electrodes, respectively). TBAF in THE may exhibit significant F-ion shuttling at room temperature and may be stable over a relatively wide electrochemical window. However, any suitable separator and electrolyte may be used.

In this example embodiment, the anions may serve as charge carriers for the energy storage cell, and the anions may be fluoride ions. In this example embodiment, the energy storage cell is rechargeable.

Moreover, in this example embodiment the second electrode may comprise a $M/MF_x$ composite electrode (where M is a metal and $MF_x$ is the corresponding metal fluoride) or (a) a second defect fluoride pyrochlore composition or (b) a weberite-type composition.

In an example embodiment, after the F-ion battery cell is assembled, a phase transformation may be effected from defect pyrochlore to a related, weberite-type structure. The phase transformation, as well as fluoride vacancy formation, occurs by charging and discharging the cell.

In an example embodiment, the reduction reaction, during charging of the battery, may be represented by the following equation:

$$AM^{II}M^{III}F_6+xe^-\rightarrow AM^{II}M^{III-x}F_{6-x}+xF^-$$

Thus, the reduction reaction is associated with F-ion removal.

In an example embodiment, the oxidation reaction, during discharging of the battery, may be represented by the following equation:

$$AM^{II}M^{III}F_6+xF^-\rightarrow AM^{II+x}M^{III}F_{6+x}+xe^-$$

Thus, the oxidation reaction is associated with F-ion insertion.

In an example embodiment, a phase transformation from defect pyrochlore to a related, weberite-type structure occurs in the early cycles (e.g., in the first 3 cycles), which continues to reversibly cycle fluoride ions. Also in the example embodiment, lattice fluoride vacancies form in early cycles (e.g., in the first 3 cycles), resulting in mixed valency of the redox-active metal sites (e.g., $M^{II}$ and $M^{III}$) and enhanced ionic and electronic conductivity. After this, room-temperature fluoride (de)intercalation can occur efficiently and quickly. Thus, a room temperature rechargeable (i.e. secondary cell) F-ion battery may be formed.

In an example embodiment, the structure of the first electrode has no appreciable change in volume during charging or discharging. Thus, the F-ion cell may be charged and discharged with very small volume changes, greatly improving cyclability. In an example embodiment, the $CsMnFeF_6$ lattice only undergoes small expansion on oxidation (F-ion insertion) and contraction on reduction (F-ion removal), with the maximum volume change being under 0.5% (preferably less than 0.35%).

In an example embodiment, the observed electrochemistry is not due to a conversion reaction, despite changes in the voltage profile observed in these early cycles (e.g., development of faradaic features and increasing capacity in the first 3 cycles). Rather, these changes are attributed to the fluoride vacancy formation, the resulting metal mixed valency, and the phase transformation from defect fluoride pyrochlore to a weberite-type structure.

In an example embodiment, a phase transformation from defect pyrochlore to a related, weberite-type structure occurs in the early cycles (e.g., in the first 3 cycles). This phase transformation is induced by the electrochemical (de)intercalation of fluoride ions, and the weberite-type structure that results from this phase transformation continues to reversibly (de)intercalate fluoride ions.

Therefore, in this example embodiment, a defect fluoride weberite-type composition is disclosed having the general formula $AMM'F_{6-7}$ (where $A=K^+$, $Rb^+$, $Cs^+$; $M/M'=Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$, $Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$; wherein the oxidation state of M and M' are such that the composition is charge balanced) is produced electrochemically.

In another example embodiment, a fluoride weberite phase, of the general formula $A_2MM'F_7$ (where $A=Na^+$; $M/M'=Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$, $Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$; wherein the oxidation states of M and M' are such that the composition is charge balanced) is produced electrochemically or synthesized by a ceramic method, as described above.

Moreover, the fluoride composition of this application can be formed by any other suitable method of creating a fluoride weberite-type composition having similar properties and functionality as described herein.

Figures 2A, 2B:
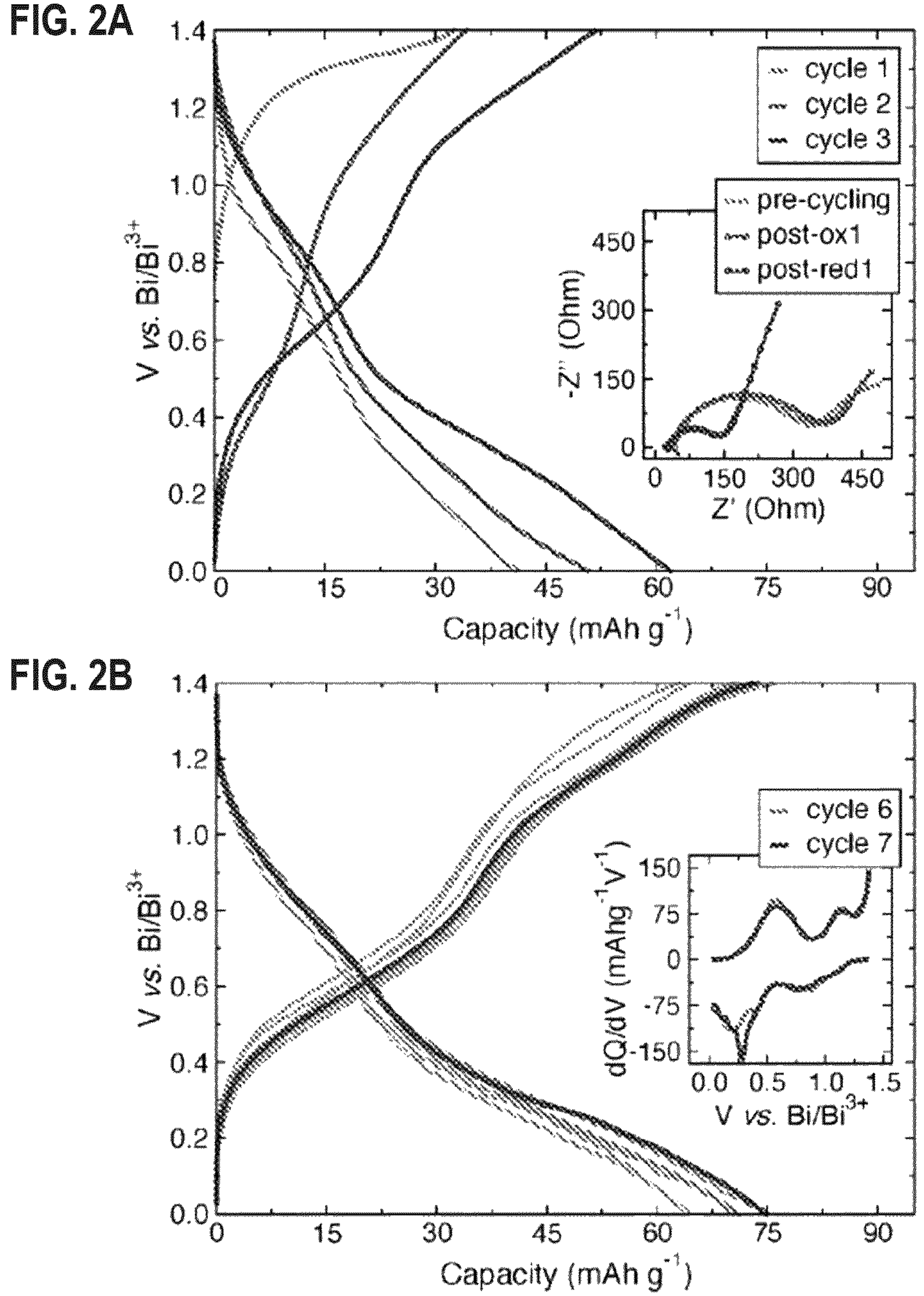
FIGS. 2A and 2B illustrate the galvanostatic cycling of an example F-ion cell, with a working electrode of mechanochemically synthesized $CsMnFeF_6$ and a $Bi/BiF_3$ composite counter electrode, in accordance with an example embodiment.
Figure 3:
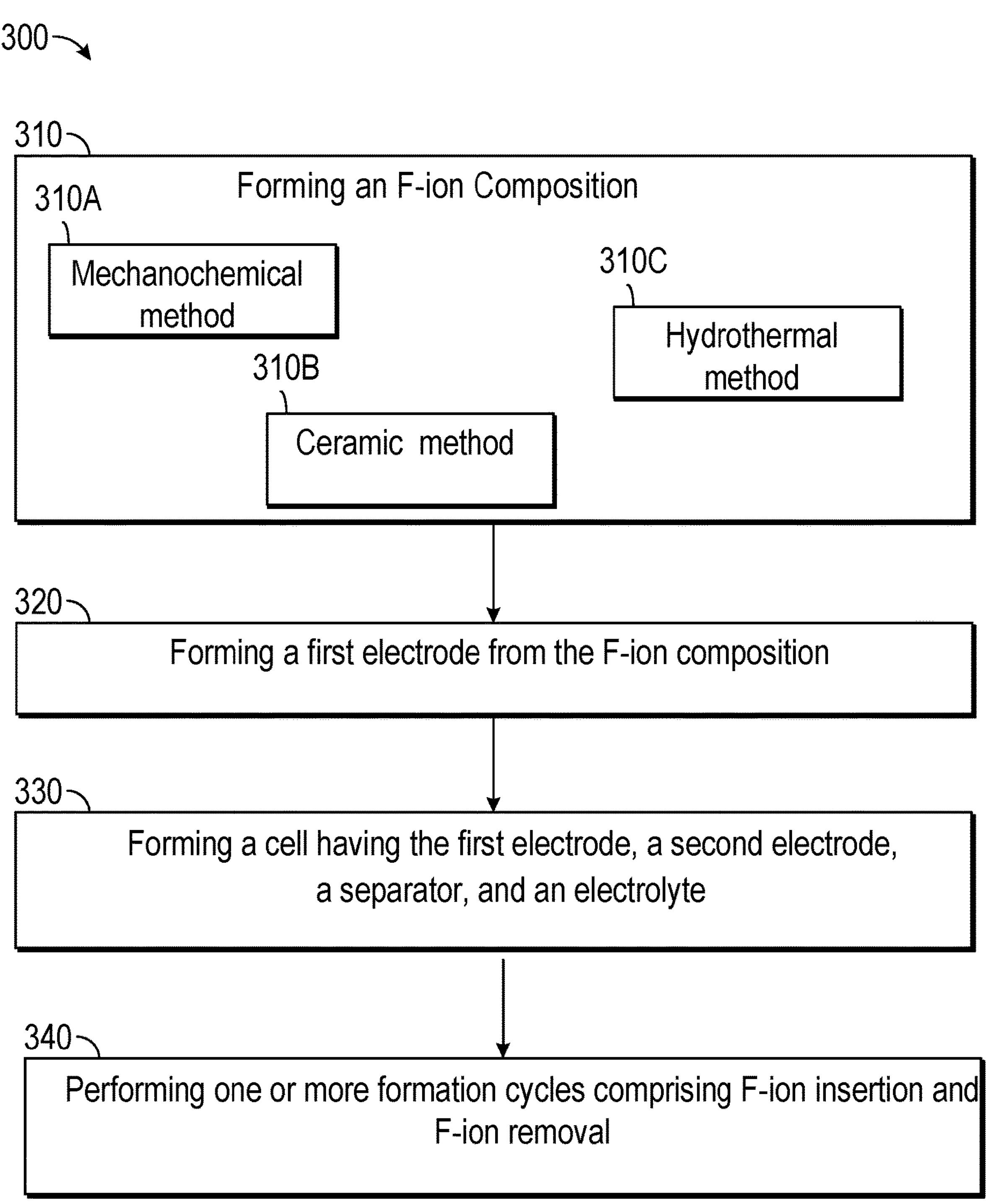
FIG. 3 illustrates an example method of manufacturing an F-ion energy storage cell, in accordance with an example embodiment.

FIGS. 2A and 2B illustrate the galvanostatic cycling of an example F-ion cell, with a working electrode of mechanochemically synthesized $CsMnFeF_6$ and a $Bi/BiF_3$ composite counter electrode, and in particular the first formation cycles (cycle 1, cycle 2, cycle 3) in FIG. 2A and cycles 4-9 in FIG. 2B. The cell is cycled at room temperature (e.g., 21-22 degrees C., though other ranges can be used) at a rate of C/20 between 0.0 V and 1.4 V vs. $Bi/Bi^{3+}$. The inset shows a differential capacity plot derived from the sixth and seventh cycles.

In accordance with various example embodiments, a method 300 of manufacturing an F-ion energy storage cell is disclosed. The method of manufacturing the F-ion energy storage cell may comprise (310) forming an F-ion composition configured for fluoride ion intercalation. In an example embodiment, the F-ion composition may comprise one of: a) a defect pyrochlore formed from one of mechanochemical methods, ceramic methods, and hydrothermal methods; or b) a fluoride weberite-type composition. The method 300 may further comprise (320) forming a first electrode from the F-ion composition and (330) forming a cell having the first electrode, a second electrode, a separator, and an electrolyte.

In a further example embodiment, the method 300 may comprise (340) performing one or more formation cycles comprising F-ion insertions (oxidation) and F-ion removal (reduction). For example, the performing one or more formation cycles may be configured to produce fluoride vacancies, metal mixed valency, and a phase transformation to a related, weberite-type structure. In an example embodiment, this occurs during at least the first three cycles of F-ion insertion (oxidation) and F-ion removal (reduction), though any suitable number of formation cycles may be used. In one example embodiment, reversible (de)insertion of F-ions dominates the electrochemistry after the fluoride vacancy/metal mixed valency formation and the phase transformation into the weberite-type composition.

Although the disclosure above focuses on anionic intercalation, in one example embodiment anionic intercalation and cationic intercalation may be combined in one host lattice to cause a multi-electron redox process.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted herein are all such embodiments that reasonably fall within the scope of the advancement to the art hereby contributed, and that the scope shall not be restricted, except in light of the appended claims and their equivalents.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A fluoride composition configured for fluoride ion intercalation, the fluoride composition comprising:

a defect fluoride pyrochlore composition of the general formula $AM^{II}M^{III}F_6$ (where $A=K^+$, $Rb^+$, $Cs^+$; $M^{II}=Mg^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$; $M^{III}=Ti^{3+}$, $V^{3+}$, $Cr^{3+}$, $Mn^{3+}$, $Fe^{3+}$, $Co^{3+}$, $Ni^{3+}$, $Al^{3+}$, $Ga^{3+}$), wherein the fluoride composition is synthesized, and wherein the fluoride composition comprises mechanochemical materials comprising particles which range in a size from 500 nm to 20 um.

2. The fluoride composition of claim 1, wherein the mechanochemical materials comprising particles that are pristine.

3. The fluoride composition of claim 1, wherein the fluoride composition is $CsMnFeF_6$.

4. An F-ion electrode, the F-ion electrode comprising the fluoride composition of claim 1, wherein the F-ion electrode comprises an F-ion intercalation host.

5. The F-ion electrode of claim 4, further comprising anionic vacancies and room-temperature fluoride ion conductivity.

* * * * *